US011666830B2

(12) United States Patent
McCoy et al.

(10) Patent No.: US 11,666,830 B2
(45) Date of Patent: Jun. 6, 2023

(54) LOCAL GAME EXECUTION FOR SPECTATING AND SPECTATOR GAME PLAY

(71) Applicant: Sony Interactive Entertainment Inc., Tokyo (JP)

(72) Inventors: Charles McCoy, San Mateo, CA (US); True Xiong, San Mateo, CA (US); Nathan Blaine Morgan, Escondido, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/379,733

(22) Filed: Jul. 19, 2021

(65) Prior Publication Data

US 2021/0339149 A1 Nov. 4, 2021

Related U.S. Application Data

(63) Continuation of application No. 16/526,824, filed on Jul. 30, 2019, now Pat. No. 11,065,550.

(51) Int. Cl.
*A63F 13/86* (2014.01)
*A63F 13/57* (2014.01)
*A63F 13/70* (2014.01)

(52) U.S. Cl.
CPC .............. *A63F 13/86* (2014.09); *A63F 13/57* (2014.09); *A63F 13/70* (2014.09)

(58) Field of Classification Search
CPC .......... A63F 13/80; A63F 13/86; A63F 13/57; A63F 13/70
See application file for complete search history.

(56) References Cited

U.S. PATENT DOCUMENTS

| 2017/0246544 | A1* | 8/2017 | Agarwal | A63F 13/63 |
| 2017/0312626 | A1* | 11/2017 | Colenbrander | H04L 67/01 |
| 2018/0001205 | A1* | 1/2018 | Osman | A63F 13/67 |
| 2018/0139257 | A1* | 5/2018 | Ninoles | H04L 65/1089 |

* cited by examiner

*Primary Examiner* — David L Lewis
*Assistant Examiner* — Shauna-Kay N. Hall
(74) *Attorney, Agent, or Firm* — Penilla IP, APC

(57) ABSTRACT

A method for gaming. The method including instantiating an instance of a video game at a local device of a spectator. Game state and user data of one or more players participating in a gaming session is received. Video frames are generated of live game play by the players using the game state and user data by executing the video game in the instance. Video frames are displayed for the live game play on a display of the spectator. A local game slice of the video game is generated for a sliced game play while executing the video game in the instance. The local game slice being responsive to inputs from a controller device of the spectator.

20 Claims, 9 Drawing Sheets

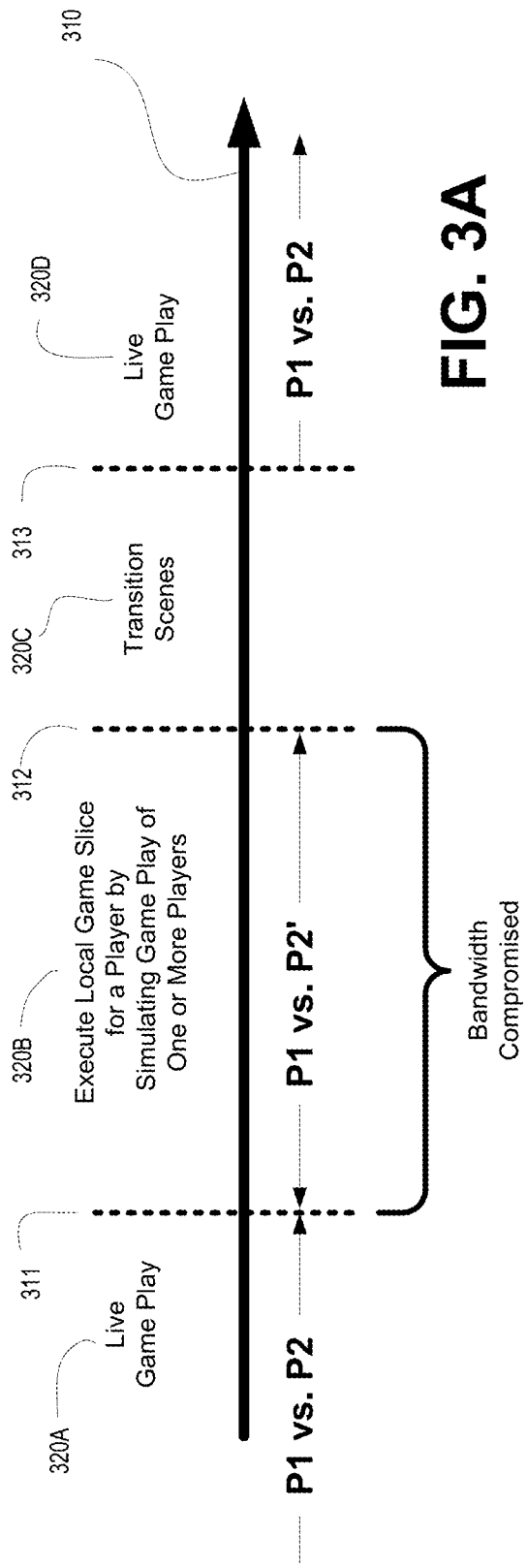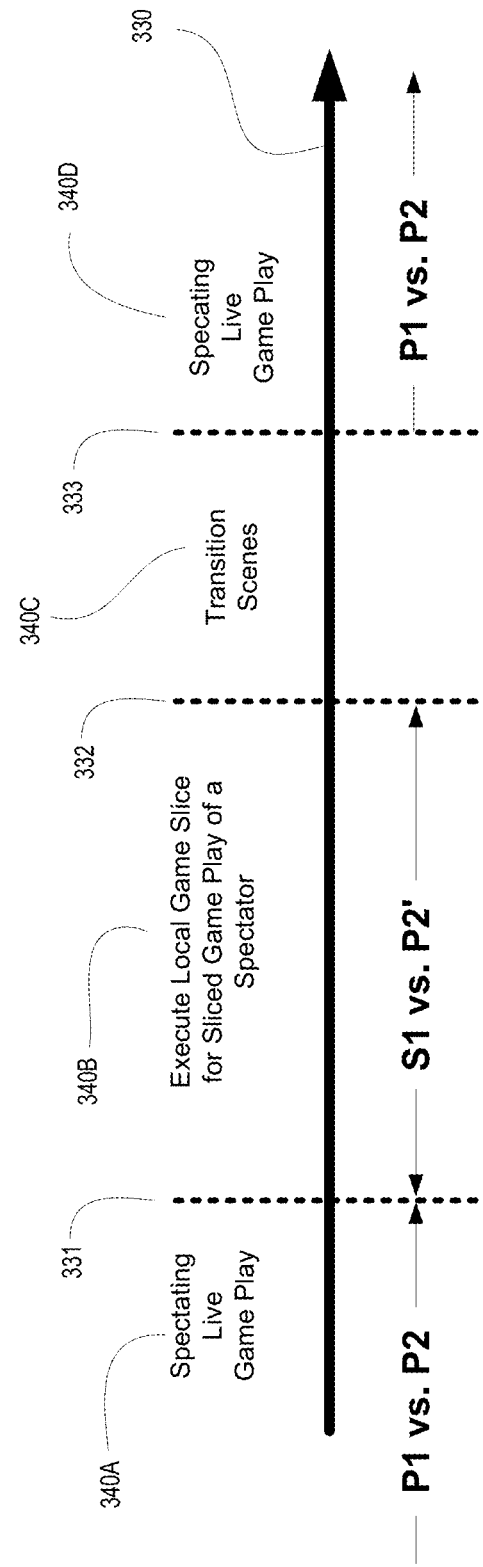

LOCAL GAME EXECUTION FOR SPECTATING AND SPECTATOR GAME PLAY

CLAIM OF PRIORITY

This application is a continuation of and claims priority to and the benefit of commonly owned, patent application, U.S. Ser. No. 16/526,824, filed on Jul. 30, 2019, entitled "Local Game Execution For Spectator and Spectator Game Play," the disclosure of which is incorporated herein in its entirety for all purposes.

TECHNICAL FIELD

The present disclosure is related to video games or gaming applications. Among other things, this disclosure describes methods and systems for local game generation for purposes of spectating an event (e.g., live game play of a video game), wherein the spectator may switch from watching the event to actively participating in a simulation of the event.

BACKGROUND OF THE DISCLOSURE

Video gaming is evolving towards higher and higher resolutions when displaying video frames. For example, the industry has moved from 720p (1280×720 pixels) to 1080p (1920×1080p pixels) resolution and is quickly transitioning to 4K resolution (3840×2160 pixels), which may also be referred to as "ultra high definition". As shown, the 4K resolution may be up to four times as many pixels than used in 1080p resolution images. In the future, video gaming will move to even higher resolutions, such as 8K resolution.

In addition, video gaming is incorporating back-end server support for providing various types of services. For example, back-end server support may provide for video game streaming, online gaming, providing various other types of information, etc. In particular, the information provided by the back-end server support relies on a robust network to transmit the higher loads of information required by the 4K and 8K video game resolutions.

However, when the network experiences lower quality of service (QoS), such as suffering from lower bandwidth, then the ability to transmit the entirety of the information is compromised which may result in a poor gaming experience for a user. For example, a player playing in a multi-player gaming session supported by a back-end server that suffers from network deficiencies may experience one or more pauses in his or her game play because of the increased video frame resolution, and eventually may quit playing the game. In addition, a spectator viewing a live event (e.g., live multi-player gaming session) that also is suffering from network deficiencies may not be able to truly view the event in real-time, resulting in the spectator quitting the viewing session.

It is in this context that embodiments of the disclosure arise.

SUMMARY

Embodiments of the present disclosure relate to local game generation for purposes of spectating an event (e.g., live game play of a video game), wherein the spectator may switch from watching the event to actively participating in a simulation of the event.

In one embodiment, a method for gaming is disclosed. The method includes instantiating an instance of a video game at a local device of a spectator. The method includes receiving game state data and user data of one or more players participating in a gaming session. The method includes generating a plurality of video frames of live game play by the one or more players using the game state data and the user data by executing the video game in the instance. The method includes displaying the plurality of video frames for the live game play on a display of the spectator. The method includes generating a local game slice of the video game for a sliced game play while executing the video game in the instance, the local game slice being responsive to a plurality of inputs from a controller device of the spectator.

In another embodiment, a non-transitory computer-readable medium storing a computer program for gaming is disclosed. The computer-readable medium includes program instructions for instantiating an instance of a video game at a local device of a spectator. The computer-readable medium includes program instructions for receiving game state data and user data of one or more players participating in a gaming session. The computer-readable medium includes program instructions for generating a plurality of video frames of live game play by the one or more players using the game state data and the user data by executing the video game in the instance. The computer-readable medium includes program instructions for displaying the plurality of video frames for the live game play on a display of the spectator. The computer-readable medium includes program instructions for generating a local game slice of the video game for a sliced game play while executing the video game in the instance, the local game slice being responsive to a plurality of inputs from a controller device of the spectator.

In still another embodiment, a computer system is disclosed, the computer system including a processor and memory, wherein the memory is coupled to the processor and having stored therein instructions that, if executed by the computer system, cause the computer system to execute a method for gaming. The method includes instantiating an instance of a video game at a local device of a spectator. The method includes receiving game state data and user data of one or more players participating in a gaming session. The method includes generating a plurality of video frames of live game play by the one or more players using the game state data and the user data by executing the video game in the instance. The method includes displaying the plurality of video frames for the live game play on a display of the spectator. The method includes generating a local game slice of the video game for a sliced game play while executing the video game in the instance, the local game slice being responsive to a plurality of inputs from a controller device of the spectator.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 3A illustrates local game generation for purposes of playing an event (e.g., live game play of a video game), wherein a period of the live event may be partially simulated, in accordance with one embodiment of the present disclosure.

FIG. 3B illustrates local game generation for purposes of spectating an event (e.g., live game play of a video game), and for purposes of active participation in a simulation of the event, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing for local game generation for purposes of spectating an event (e.g., live game play of a video game), wherein the spectator may switch from watching the event to actively participating in a simulation of the event (e.g., game slice). For example, the spectator may be spectating or watching a live game play through renderings of the video game created through a game engine running locally, in which case they can switch to playing the video game through their locally running game engine that is executing the game slice. That is, the spectator may switch from watching an event to actively participating in a simulation of the in-game environment of the event. In particular, a generic game environment renderer is run locally and is loaded with models of the game to allow it to render the in-game environment in near real time from a stream of game meta-data for purposes of spectating, in one embodiment. Also, if such game play (e.g., live event) is done through streaming or online gaming, then the game slice can be joined without a delay, in one embodiment. In particular, the game play of the game slice as performed by the spectator is done in a copy of the in-game environment so that the spectator can experience the game play and in-game environment set up from the point of view of a player without having an effect on the actual game play. Such game play may have things unlocked to allow spectators to more easily wander around and explore the game environment.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

With the above general understanding of the various embodiments, example details of the embodiments will now be described with reference to the various drawings.

Figure 1A:
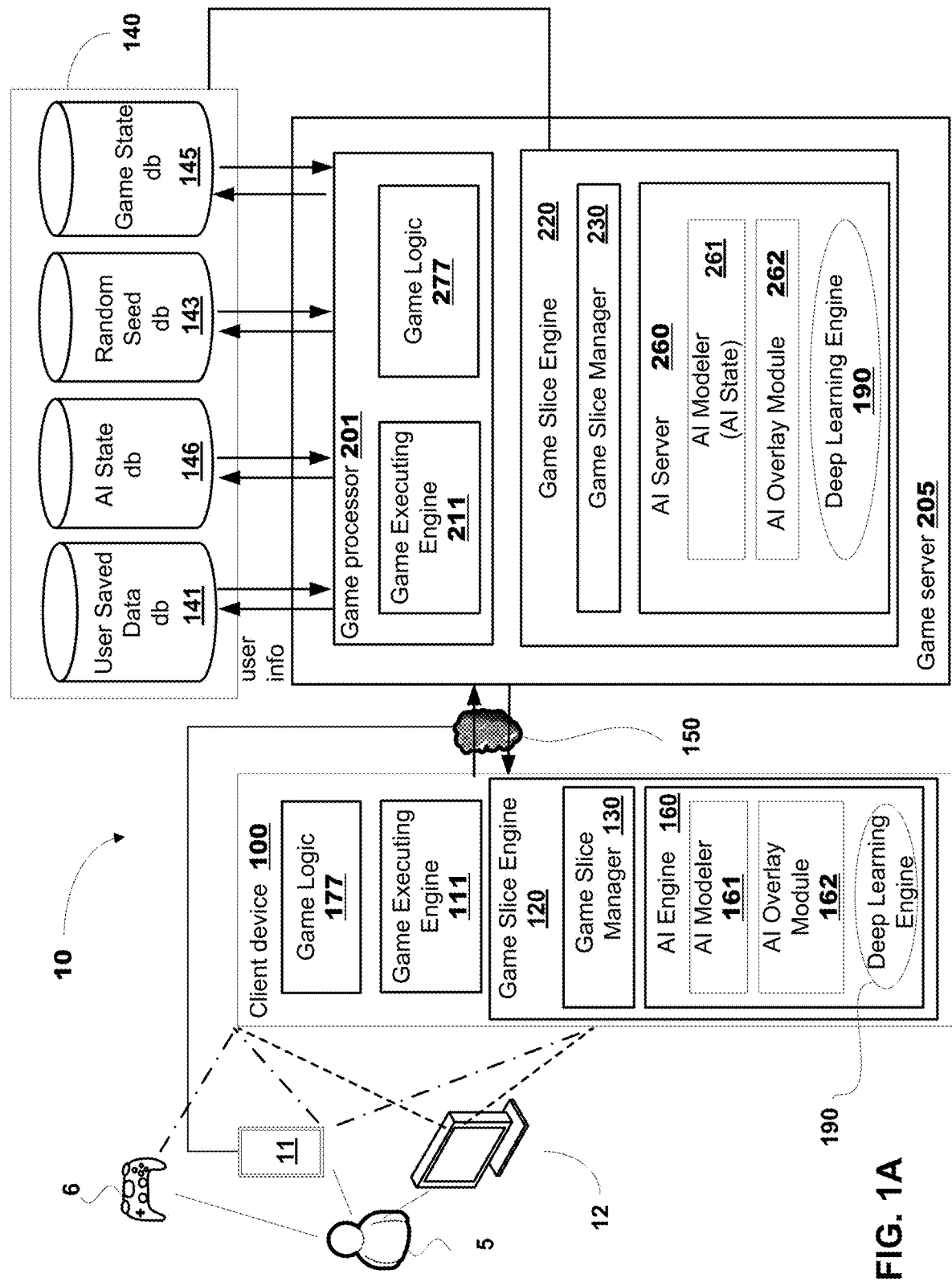
FIG. 1A illustrates a system used for local game generation for purposes of spectating an event (e.g., live game play of a video game), wherein the spectator may switch from watching the event to actively participating in a simulation of the event, in accordance with one embodiment of the present disclosure.

FIG. 1A illustrates a system 10 used for local game generation for purposes of spectating an event (e.g., live game play of a video game), wherein the spectator may switch from watching the event to actively participating in a simulation of the event (e.g., through a game slice), in accordance with one embodiment of the present disclosure.

As shown in FIG. 1A, the video game (e.g., game logic 177) may be executing locally at a client device 100 of the user 5, or the video game (e.g., game logic 277) may be executing at a back-end game executing engine 211 operating at a back-end game server 205 of a cloud game network or game cloud system. The game executing engine 211 may be operating within one of many game processors 201 of game server 205. In either case, the cloud game network is configured to provide support for spectating an event (e.g., live or recorded) and switch to actively participating in a simulation of the event through a game slice, wherein the spectating and the game slice may be executing on a local device or a back-end server. Further, the gaming application may be executing in a single-player mode, or multi-player mode, wherein embodiments of the present invention provide for multi-player enhancements (e.g., assistance, communication, game slice generation, etc.) to both modes of operation.

In some embodiments, the cloud game network 210 may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network 210 is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor module 201 that provides access to a plurality of interactive gaming applications. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5. For example, game server is configurable to provide a companion interface displayable to user 5 for purposes of generating and/or receiving contextually relevant information, as will be further described below.

Client device 100 is configured for requesting access to a gaming application over a network 150, such as the internet, and for rendering instances of video games or gaming applications executed by the game server 205 and delivered to the display device 12 associated with a user 5. For example, user 5 may be interacting through client device 100 with an instance of a gaming application executing on game processor 201. Client device 100 may also include a game executing engine 111 configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game.

Network 150 may include one or more generations of network topologies. As newer topologies come online, increased bandwidth is provided to handle ever greater resolutions of rendered images and/or media. For instance, 5G networks (fifth generation) providing broadband access through digital cellular network will replace the 4G LTE mobile networks. 5G wireless devices connect to a local cell through local antennas. These antennas are then connected to the telephone network and internet by high bandwidth connections (e.g., optical fiber, etc.). It is expected that 5G networks operate at higher speeds with better quality of service. As such, higher resolution of video frames and/or media can be provided over these newer network topologies in association with video gaming.

Client device 100 is configured for receiving rendered images, and for displaying the rendered images on display 12. For example, through cloud based services the rendered images may be delivered by an instance of a gaming application executing on game executing engine 211 of game server 205 in association with user 5. In another example, through local game processing, the rendered images may be delivered by the local game executing engine 111 (e.g., for game play or for spectating). In either case, client device 100 is configured to interact with the executing engine 211 or 111 in association with the game play of user 5, such as through input commands that are used to drive game play.

Further, client device 100 is configured to interact with the game server 205 to capture and store metadata of the game play of user 5 when playing a video game, wherein each metadata includes information (e.g., game state, etc.) related to the game play. More particularly, game processor 201 of game server 205 is configured to generate and/or receive metadata of the game play of user 5 when playing the gaming application. For instance, metadata may be generated by the local game execution engine 111 on client device 100, outputted and delivered over network 150 to game processor 201. In addition, metadata may be generated by game executing engine 211 within the game processor 201, such as by an instance of the gaming application executing on engine 211. In addition, other game processors of game server 205 associated with other virtual machines are configured to execute instances of the gaming application associated with game plays of other users and to capture metadata during those game play.

In embodiments, if the user 5 is a spectator of a live event that is generated through local rendering of an in-game environment, the metadata enables the spectator to control a branch-off of the live event in a game slice that is also executed locally, wherein the game slice is based off the metadata of the generation of the live event. In particular, the metadata provides information that enables execution of a game slice of the video game, so that the spectator can experience the in-game environment as generated during the live event, such as through controlling a simulation of the live event. That is, the metadata and/or information enables execution of an instance of the gaming application for the game slice. Various metadata is stored in relevant databases independently configured or configured under data store 140, in embodiments, as will be described below. Further, the metadata and information may provide and/or be analyzed to provide additional information related to the game play of the user.

More particularly, the metadata also includes game state data that defines the state of the game at that point. For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at a corresponding point. The game state data may be stored in game state database 145 of datastore 140. In some embodiments, some game state data may only be stored in memory.

The metadata also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the metadata. For example, user saved data may include the game difficulty selected by the user 5 when playing the game, game level, character attributes, character location, number of lives left, the total possible number of lives available, armor, trophy, time counter values, and other asset information, etc. User saved data may also include user profile data that identifies user 5, for example. User saved data is stored in database 141 of datastore 140.

In addition, the metadata also includes random seed data that is generated by artificial intelligence (AI) module 215. The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. The game state data may include learning done by the AI, such as having the AI remember previous interactions with the player so that those interactions can influence future decisions made by the AI. As an illustration, these AI characters may randomly walk the streets in a city scene. In addition, other objects may be generated and presented in an overlay. For instance, clouds in the background and birds flying through space may be generated and presented in an overlay. The random seed data is stored in random seed database 143 of data store 140.

In that manner, a spectator wishing to experience the game play of a player playing the video game may control a game slice of a simulation of a live event, wherein local rendering of the video game may support the spectating, and local rendering using available metadata of the live event may be generated for the game slice. In that manner, the game slice enables the spectator to experience the in-game environment as being played by the player in the live event (e.g., a multi-player gaming session). The spectator may elect to return to spectating the live event at any point in time. The live game play that occurred while the spectator was playing the game slice can be recorded and made available for the spectator to watch later. The spectator may watch the recorded game play after the game match is over, after the game slice play is over while watching the live game play, or while playing the game slice.

In particular, the game server 205 includes a game slice engine 220 that is configured for supporting a game slice controlled by a spectator (e.g., user 5). For example, the spectator is spectating a live event (e.g., a gaming session of a video game being played by one or more players), wherein the live event is rendered locally by executing a local copy of game logic 177 of the video game on the game engine 111 of client device 100, or by the back-end server (e.g., at the game engine 211). Requisite metadata (e.g., user data, game state, AI data, random seed data, etc.) is delivered to the client device instead of sending rendered video images of high resolution for display to the spectator. In that manner, less bandwidth is required to send metadata instead of the high resolution rendered video images. For example, the game slice engine 220 includes a game slice manager 230 that is configured to generate and execute the game slice at the back-end server, in one embodiment. In other embodiments, to save bandwidth the game slice is generated and executed at the client device 100, as described below. The game slice manager 230 receives information from the AI server 260 that is configured to model one or more objects in the in-game environment of the video game. For example, the AI modeler 261 is configured to model a character that is controlled by a player, wherein the AI modeler 261 may determine behaviors and/or strategies of the player (current tendencies or historical tendencies) for purposes of simulating the corresponding character in the game slice for the spectator as determined through the deep learning engine 190. For example, the AI modeler 261 generates AI state that is stored in database 146 of datastore 140. In that manner, the simulated character may closely mimic the character being controlled by a player (e.g., have similar kill/death ratio, hunting styles, behaviors, tendencies, etc.). In other implementations, the object may be a non-player controlled (NPC) character. The AI modeler 261 generates AI state 261 (e.g., stored in database 146) that is delivered to the game slice manager for generating the game slice being controlled by the spectator. An AI overlay module 262 may be configured to generate the object being generated by the AI modeler.

In another embodiment, the client device 100 includes a game slice engine 120 that is configured for supporting a game slice controlled by a spectator (e.g., user 5). For example, the spectator is spectating a live event (e.g., a gaming session of a video game being played by one or more players), wherein the live event is rendered locally by executing a local copy of game logic 177 of the video game on the game engine 111 of client device 100. Requisite metadata (e.g., user data, game state, AI data, random seed data, etc.) is delivered to the client device to generate the rendered images of the live event for spectating by the spectator (e.g., user 5). The game slice manager 130 receives information from the AI server 260 that is configured to model one or more objects in the in-game environment of the video game, as previously described. In some implementations, the game slice engine 120 may also be configured to perform AI (artificial intelligence) to model a character (e.g., controlled by a player or NPC) using AI modeler 161, AI overlay module 162, and deep learning engine 190.

Figure 1B:
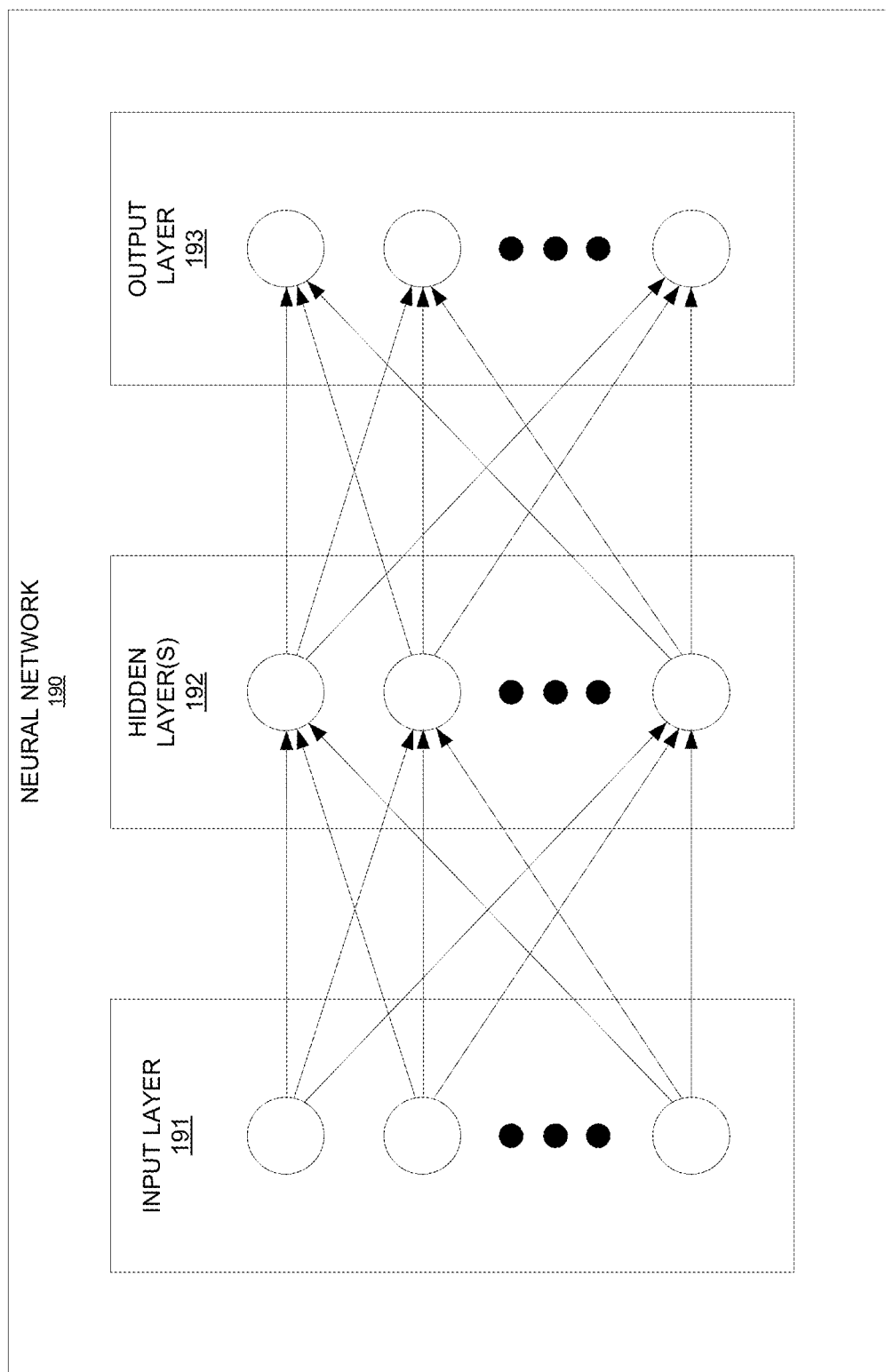
FIG. 1B illustrates an example neural network used to build an artificial intelligence (AI) model, in accordance with one embodiment of the present disclosure.

FIG. 1B illustrates an example neural network 190 (e.g., deep learning engine) used to build a trained AI model that learns, in part, the behaviors of an object within an in-game environment of a live event (e.g., gaming session of a video game), wherein the object may be player controlled or NPC.

In that manner, given as input a condition of a game play of the gaming application (e.g., game state of a particular game play) the AI model can analyze the condition and provide an appropriate response to the condition, such as to simulate the actions performed by the object. For example, the AI model may simulate a player controlled character that mimics the behaviors, tendencies, skills of a player (e.g., kill/death ratio, style and skill of play, etc.) in order to provide a simulation of the character in the game slice being controlled by a spectator and for a given condition (e.g., game state).

In some embodiments, the AI can take over for a player when they wish to quit playing to provide a best estimate of how that player would have continued with their game play, which can provide continuity of game play for team mates or opposing players playing in the game match with the player. The players may be playing in the same physical location, or may be playing in the game match over a network connection. The players may be playing on the same physical device, or may be using more than one device.

More particularly, the AI model is trained and/or built using the deep learning engine 190, in accordance with one embodiment of the present disclosure. The neural network 190 may be implemented within an AI server 260 at a back-end server, in one embodiment. In particular, the AI modeler 161 of the deep learning engine 190 is configured to learn the behaviors, tendencies, skills of an object (e.g., character) for use in the game slice. In that manner, the spectator is able to experience the in-game environment through a simulation, wherein other characters (e.g., those controlled by other players or NPC) are simulated using AI models.

Specifically, the deep learning or machine learning engine 190 in cooperation with AI modeler 261 is configured to analyze training data collected during recent game play of the video game. For example, training data may be specific to a particular character and/or the player controlling that character in the current game play of a gaming session. The deep learning engine 190 utilizes artificial intelligence, including deep learning algorithms, reinforcement learning, or other artificial intelligence-based algorithms to build a trained AI model that relates to one or more objects in the in-game environment of the video game, in order to simulate the actions of that object in the game slice. The deep learning engine 190 may be configured to continually refine the trained AI model given any updated training data. The refinements are based on determining which sets of training data can be used for training based on how those sets perform within the gaming application based on corresponding success criteria.

More particularly, during the learning and/or modeling phase, the training data 345 is used by the deep learning engine 190 to predict and/or determine actions taken by the object (e.g., simulated character) for a set of input data based on success criteria (e.g., maintaining the character's kill/death ratio, etc.). The resulting AI model of the gaming application can be used to determine actions to be performed by that object given any set of input data. For example, the input data may be game state data (e.g., including controller input, etc.), and the trained AI model 160 may be used to generate a response to the input data. That is, an AI model is generated by the neural network 190 to create a character profile or player profile that is used to control actions of an object (e.g., character). In that manner, The AI model may be used by the game slice engine to control a bot opponent (e.g., NPC) within the in-game environment of the video game, or a player controlled opponent.

The neural network 190 represents an example of an automated analysis tool for analyzing data sets to determine the intricacies of playing a gaming application, to include the responses and/or actions that can be determined and/or performed during a game play of a gaming application. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning, or rewards based learning (e.g., through the use of success criteria, success metrics, etc.). For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to instances of a game play of the gaming application, wherein the instances include one or more features that define that instance (e.g., controller input, game state, results data, etc.). The intermediary predictions of the model are determined through a classifier that creates labels (e.g., outputs, features, nodes, classifications, etc.).

At the highest hierarchical level, an output layer 193 exists. The output layer 193 includes a set of output nodes. An output node represents a decision (e.g., action, prediction, prediction of success of a game play for a given set of input data, etc.) that relates to one or more components of a trained AI model 160, for example. As previously described, the output nodes may identify the predicted or expected actions, or learned actions for a given set of inputs, wherein the inputs may define various scenarios or parts of scenarios of a gaming application. These results can be compared to predetermined and true results, or learned actions and results (e.g., kill/death ratio, etc.), as obtained from current and/or previous game plays used for collecting the training data in order to refine and/or modify the parameters used by the deep learning engine 190 to iteratively determine the appropriate predicted or expected responses and/or actions for a given set of inputs. That is, the nodes in the neural network 190 learn the parameters of the trained AI model 160 that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the predicted or expected responses and/or actions to be performed for a given set of inputs or input data. In this illustration, the data domain includes game play data collected through multiple game plays of multiple users to define baseline input data. In another example, the training dataset is from different data domains to include input data other than baseline.

As such, the neural network 190 may predict or determine, in part, predicted or expected responses and/or actions to be performed for a given set of inputs (a condition of a gaming application, such as game state). Based on these predictive results, the neural network 190 may also define the trained AI model 160 that is used to provide determine those results and/or actions (e.g., the various functionalities relating to the gaming application and/or game plays of the gaming application) to be performed given a set of inputs.

In some implementations, an AI model 160 may know a set of general player styles and characteristics and determine how well each one applies to a particular player. For example, a player may tend to hide from unknown creatures, or may tend to thoroughly explore every object in their environment before moving on, or may tend to shoot anything that moves before determining what it is. By applying the player styles and characteristics that best fit a player and the current game situation, the AI can result in game play that is similar in style to how the player would have played.

Figure 2A:
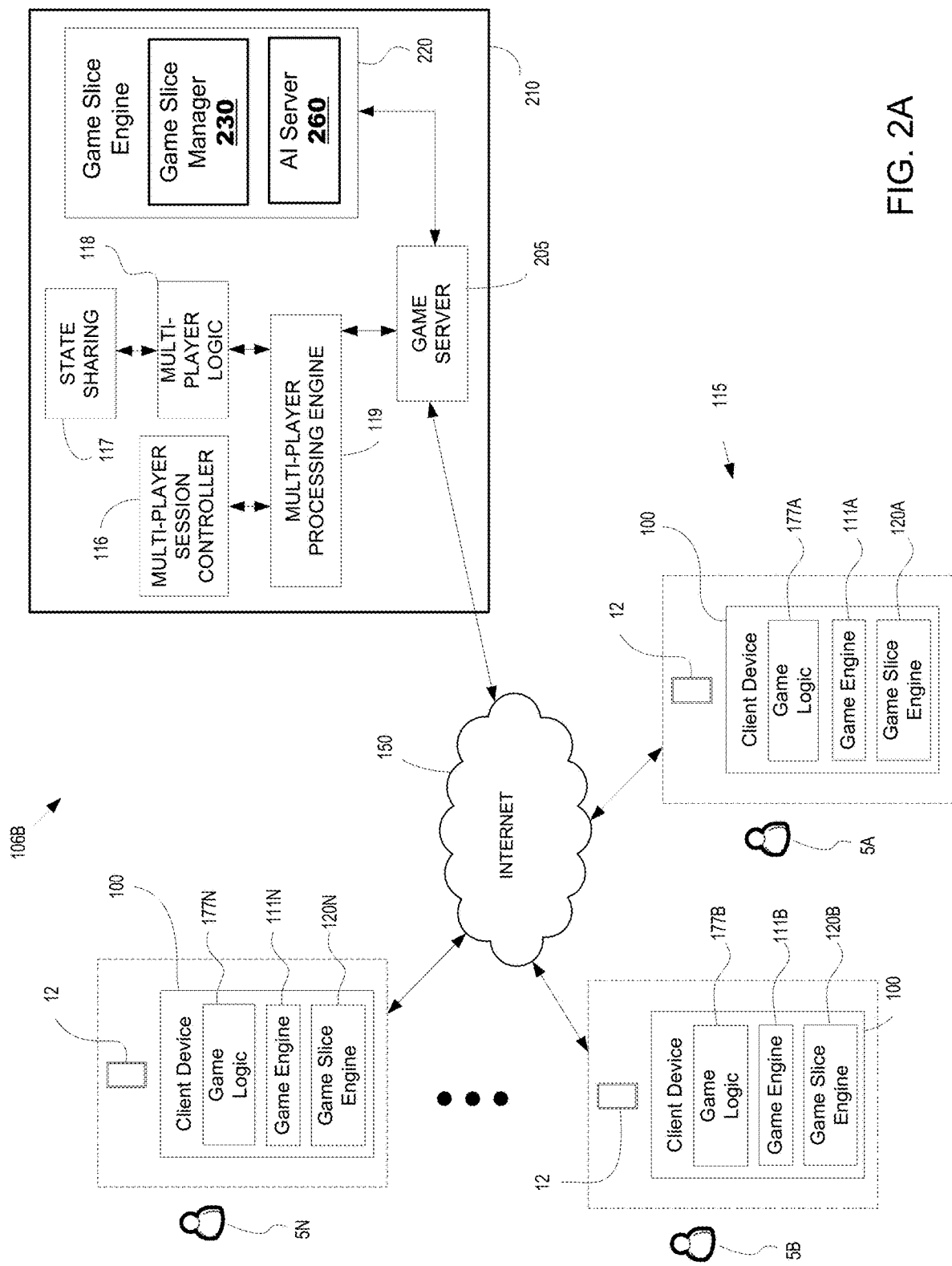
FIG. 2A illustrates a system providing gaming control to one or more users playing one or more gaming applications that are executing locally to the corresponding user, and wherein local game generation may be implemented for spectating a live event and active participation in a simulation of the event by a spectator, in accordance with one embodiment of the present disclosure.

FIG. 2A illustrates a system 106B providing gaming control to one or more users playing one or more gaming applications that are executing locally to the corresponding user, and wherein back-end server support (e.g., accessible through game server 205) may implement a location based companion interface supporting game play of a corresponding user, in accordance with one embodiment of the present disclosure. In one embodiment, system 106B works in conjunction with system 10 of FIG. 1A to implement local and/or remote game generation for purposes of spectating an event (e.g., live game play of a video game), wherein the spectator may switch from watching the event to actively participating in a simulation of the event (e.g., game slice). Referring now to the drawings, like referenced numerals designate identical or corresponding parts.

As shown in FIG. 2A, a plurality of users 115 (e.g., user 5A, user 5B . . . user 5N) is playing a plurality of gaming applications, wherein each of the gaming applications is executed locally on a corresponding client device 100 (e.g., game console) of a corresponding user. In addition, each of the plurality of users 115 has access to a display 12, previously introduced, configured to display rendered images for a live event, for spectating a live event (e.g., gaming session of a video game) or for participating in a game slice of a simulation of the live event.

For example, user 5A may be playing a first video game on a corresponding client device 100, wherein an instance of the first video game is executed by a corresponding game title execution engine 111. Game logic 177A (e.g., executable code) implementing the first video game is stored on the corresponding client device 100, and is used to execute the first video game. For purposes of illustration, game logic may be delivered to the corresponding client device 100 through a portable medium (e.g., flash drive, compact disk, etc.) or through a network (e.g., downloaded through the internet 150 from a gaming provider). In addition, user 5B is playing a second video game on a corresponding client device 100, wherein an instance of the second video game is executed by a corresponding game title execution engine 111. The second video game may be identical to the first video game executing for user 5A or a different video game. Game logic 177B (e.g., executable code) implementing the second video game is stored on the corresponding client device 100 as previously described, and is used to execute the second video game. Further, user 115N is playing an Nth video game on a corresponding client device 100, wherein an instance of the Nth video game is executed by a corresponding game title execution engine 111. The Nth video game may be identical to the first or second video game, or may be a completely different video game. Game logic 177N (e.g., executable code) implementing the third video game is stored on the corresponding client device 100 as previously described, and is used to execute the Nth video game.

As previously described, client device 100 may receive input from various types of input devices, such as game controllers, tablet computers, keyboards, gestures captured by video cameras, mices touch pads, etc. Client device 100 can be any type of computing device having at least a memory and a processor module that is capable of connecting to the game server 205 over network 150. Also, client device 100 of a corresponding user is configured for generating rendered images executed by the game title execution engine 111 executing locally or remotely, and for displaying the rendered images on a display. For example, the rendered images may be associated with an instance of the first video game executing on client device 100 of user 5A. For example, a corresponding client device 100 is configured to interact with an instance of a corresponding video game as executed locally or remotely to implement a game play of a corresponding user, such as through input commands that are used to drive game play.

In embodiments, any of the client devices 100 may be used for spectating a live event, such as a gaming session of a video game being played by one or more users (e.g., users 5A-5N). Also, the client devices 100 may be configured to generate and execute, or generally support a game slice. For example, client device 100 of user 5A may be used for spectating a live event and for generating a game slice that simulates the live event using the game slice engine 120A to allow the user 5A to experience the in-game environment through a simulation of the live event. Other client devices may be similarly configured. For example, client device 100 of user 5B may include a game slice engine 120B . . . and client device 100 of user 5N may include a game slice engine 120N.

In one embodiment, client device 100 is operating in a single-player mode for a corresponding user that is playing a gaming application. Back-end server support via the game server 205 may provide game slice services supporting spectating and game play through a game slice of a corresponding spectator, as will be described below, in accordance with one embodiment of the present disclosure.

In another embodiment, multiple client devices 100 are operating in a multi-player mode for corresponding users that are each playing a specific gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, users in the session can communicate with each other as controlled by the multi-player session controller 116. Back-end server support via the game server 205 may provide game slice services supporting spectating and game play through a game slice of a corresponding spectator, as will be described below, in accordance with one embodiment of the present disclosure.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1C and FIG. 2, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115A when playing the game, game level, character attributes, character location, number of lives left, the total possible number of lives available, armor, trophy, time counter values, etc. User saved data may also include user profile data that identifies a corresponding user 115A, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide game slice services supporting spectating and game play through a game slice of a corresponding spectator, in accordance with one embodiment of the present disclosure. In particular, game slice engine 220 includes a game slice manager 230 configured for generating a game slice for rendering video frames, and an AI server 260 for providing AI state including AI models of objects (e.g., NPC or player controlled characters). In another embodiment, the game slice is generated locally at a client device of a corresponding spectator, such as user 5A. In that case, the game slice engine 120A includes game slice manager configured for generating a game slice for rendering video frames, in part using AI state from AI server 260 (or generated locally) including AI models of objects (e.g., NPC or player controlled characters).

Figure 2B:
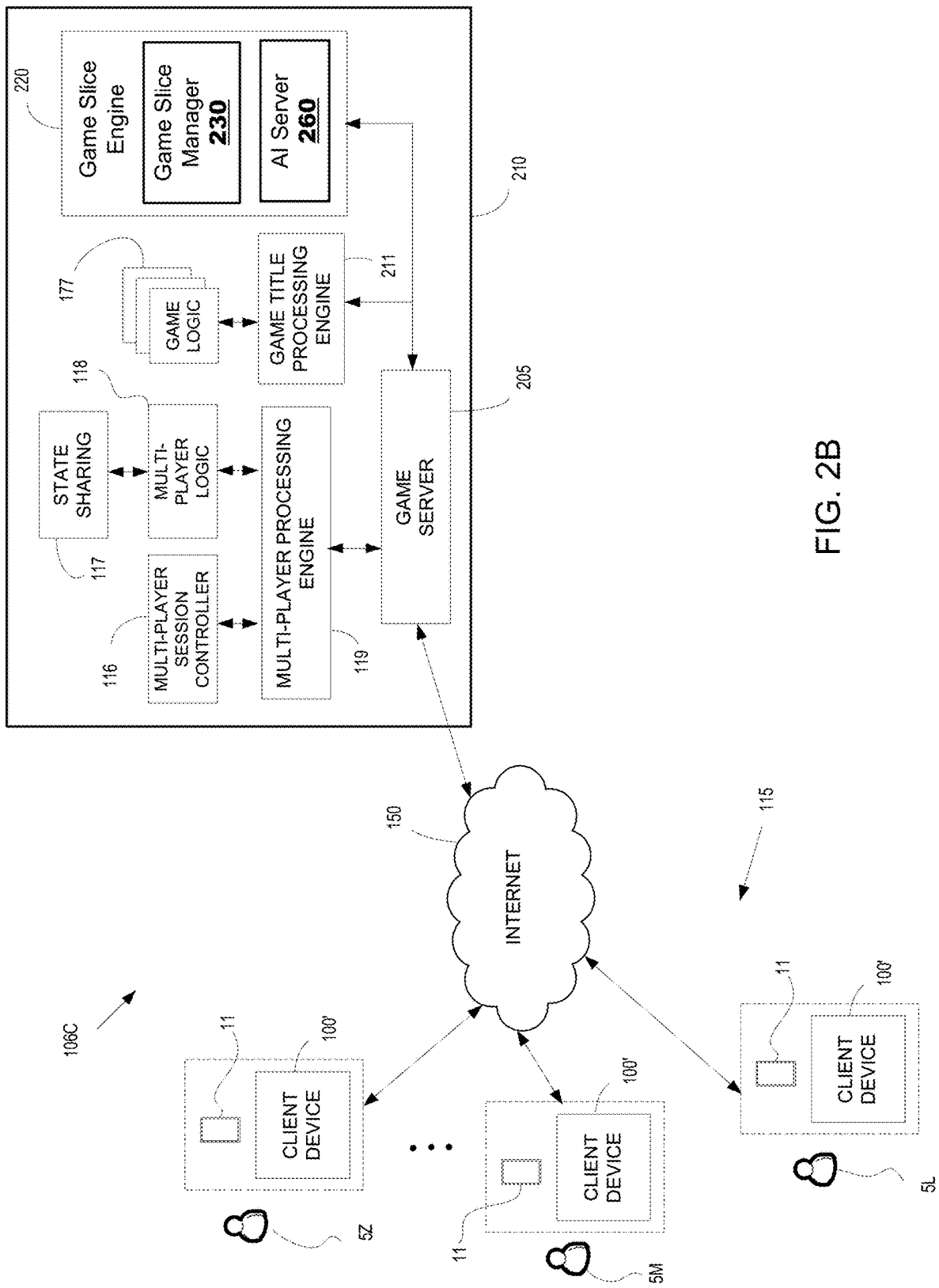
FIG. 2B illustrates a system providing gaming control to one or more users playing a gaming application as executed over a cloud game network, and wherein back-end server support may support game generation for spectating a live event and active participation in a simulation of the event by a spectator, in accordance with one embodiment of the present disclosure.

FIG. 2B illustrates a system 106C providing gaming control to a plurality of users 115 (e.g., users 5L, 5M . . . 5Z) playing a video game as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In one embodiment, system 106C works in conjunction with system 10 of FIG. 1A to implement the local and/or remote game generation for purposes of spectating an event (e.g., live game play of a video game), wherein the spectator may switch from watching the event to actively participating in a simulation of the event (e.g., game slice). Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of video games to a plurality of corresponding users (e.g., players, spectators, etc.).

A plurality of users 115 accesses the game cloud system 210 via network 150, wherein users (e.g., users 5L, 5M . . . 5Z) access network 150 via corresponding client devices 100', wherein client device 100' may be configured similarly as client device 100 of FIGS. 1A-1B (e.g., including game executing engine 111, etc.), or may be configured as a thin client providing that interfaces with a back end server providing computational functionality (e.g., including game executing engine 211). In addition, each of the plurality of users 115 has access to a device 12, previously introduced, configured to display rendered images for a live event, for spectating a live event (e.g., gaming session of a video game) or for participating in a game slice of a simulation of the live event.

Within the context of a player, a client device 100' of a corresponding user 5L is configured for requesting access to gaming applications over a network 150, such as the internet, and for rendering instances of gaming application (e.g., video game) executed by the game server 205 and delivered to a display device associated with the corresponding user 5L. For example, user 5L may be interacting through client device 100' with an instance of a gaming application executing on game processor of game server 205. More particularly, an instance of the gaming application is executed by the game title execution engine 211. Game logic (e.g., executable code) implementing the gaming application is stored and accessible through data store 140, previously described, and is used to execute the gaming application. Game title processing engine 211 is able to support a plurality of gaming applications using a plurality of game logics 177, as shown.

As previously described, client device 100' may receive input from various types of input devices, such as game controllers, tablet computers, keyboards, gestures captured by video cameras, mice touch pads, etc. Client device 100' can be any type of computing device having at least a memory and a processor module that is capable of connecting to the game server 205 over network 150. Also, client device 100' of a corresponding user is configured for generating rendered images executed by the game title execution engine 211 executing locally or remotely, and for displaying the rendered images on a display. For example, the rendered images may be associated with an instance of the first gaming application executing on client device 100' of user 5L. For example, a corresponding client device 100' is configured to interact with an instance of a corresponding gaming application as executed locally or remotely to implement a game play of a corresponding user, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user 115A at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the game server 205 may provide for generation of video frames for a live event (e.g., a multi-player gaming session), wherein any of the client devices 100' may be used for spectating the live event. Back-end server support may provide for generating a game slice that simulates the live event using the game slice engine 220 to allow the spectator to experience the in-game environment through a simulation of the live event.

FIG. 3A illustrates local game generation for purposes of playing an event, wherein a period of the live event may be partially simulated, in accordance with one embodiment of the present disclosure. The event may be a live game play of a video game in a multi-player gaming session, wherein one player of the video game may be experiencing some network degradation (e.g., falling bandwidth). In embodiments of the present disclosure, a local game slice may be initiated during periods experiencing network degradation so that the game play of the user is continuous.

As shown, in the period 320A before time separator 311 live game play of the multi-player gaming session (e.g., in an eSports environment) is occurring. Player P1 is playing against a live player P2 through respective characters. For example, in an online gaming environment, player P1 is receiving metadata (e.g., game state of player P2, user data of player P2, etc.) for local rendering of the video frames of the live game play using a local game engine. The live game play may be rendered using a back-end server which then streams the live game play to the device of player P1, in another embodiment.

In the period 320B between time separators 311 and 312, player P1 is experiencing network difficulties (e.g., falling bandwidth). Rather than having pauses within the game play of player P1 which can be disrupting to certain players, embodiments of the present disclosure provide for the execution of a local game slice for the player P1, wherein the local game slice is able to use AI data to simulate game play of one or more other players, such as through simulation of characters controlled by those players. For example, player P1 may be playing against a simulation of a player P2 through respective characters. That is, a simulated character controlled by a simulation (P2') of player P2 may be generated using AI data that defines behaviors, tendencies, skills, and other learned characteristics of the player P2 and/or the character controlled by player P2. In that manner, the local game slice is initiated during periods experiencing network degradation so that the game play of the user is continuous.

In the period 320C between time separators 312 and 313, player P1 may be transitioned back to live game play in the multi-player gaming session. That is, the network difficulties previously encountered in period 320B exist no longer. As such, there is sufficient bandwidth for player P1 to begin receiving information related to the live game play. In one embodiment, one or more transition scenes may be displayed to the user to align the game play in the game slice and the continuing live game play of the multi-player gaming session. For example, a building in the in-game environment may have been destroyed in the live game play; however, in the game slice because there are no updated metadata being provided the building may still be standing. As such, transition scenes may be generated that show the building being destroyed. Identification and generation of these transition scenes may be performed using AI. In another embodiment, the transition scenes may be pre-defined and generically apply to any transition between the game slice and live game play.

In the period 320D after time separator 313, player P1 is returned back to live game play. In that manner, player P1 returns to play against a live version of player P2, through respective characters in the in-game environment.

FIG. 3B illustrates local game generation for purposes of spectating an event (e.g., live game play of a video game), and for purposes of active participation in a simulation of the event, in accordance with one embodiment of the present disclosure. The event may be a live game play of a video game in a single or multi-player gaming session. As previously described, local game generation is performed using a local copy of the game logic of the video game for purposes of spectating. That is, metadata associated with the gaming session is delivered to the game logic on the client device of the spectator to generate the game play for display. In one embodiment, the spectator may decide to experience the in-game environment of the gaming session through a game slice, as described below. The spectator may take over control of a player controlled character, an NPC, or a new character in the game slice.

As shown, in the period 340A before time separator 331 live game play of the multi-player gaming session is occurring. A spectator is spectating the live game play through local generation of the video frames, as previously described. In particular, metadata (e.g., game state, user data, etc.) is delivered to the game logic executing on the local game engine to render the video frames for the live game play. For example, the live game play may show a player P1 playing against a live player P2 through respective characters. The live game play may be through online gaming or streaming by a cloud gaming network, as previously described.

In the period 340B between time separators 331 and 332, spectator S1 may decide to begin a local game slice. For example, spectator S1 may wish to experience the in-game environment of the live game play. As before, the live game play continues. In this case, player P1 continues to play against player P2, though the spectator is no longer spectating the live event. Because the spectator cannot play against the live player P2 (as the live game play is continuing or because live player P2 does not wish to play against spectators), a simulated version of player P2 or the character controlled by player P2 is generated and used during the game slice controlled by spectator S1. In that manner, spectator S1 is playing against the simulated player P2', which is a simulation of player P2, through a respective also simulated character. As previously described, an AI model may be used for simulated player P2' and its respective character. In some game play, P1 and P2 are playing on the same team, or cooperatively with each other, instead of playing in opposition to each other.

In some embodiments, P2 is an NPC controlled by game AI instead of a character controlled by a player. In such an embodiment, P2' can be created by cloning the state of the game AI at the time point 304B where the local game slice play begins.

In some embodiments, data from the live game play of player P2 during time period 340B is provided to the AI controlling player P2', which is used to improve the decisions made for how player P2' plays during time period 340B.

In some embodiments, spectator S1 can play along with one or more other spectators in the same local game slice. The one or more other spectators may be physically present with spectator S1, or may play from one or more different locations over one or more network connections. The one or more other spectators may take over control of one or more other existing characters in the live game play, in one embodiment. The one or more other spectators may take over control of one or more characters that are newly introduced to the game play in the local game slice, in another embodiment.

In some embodiments, spectator S1 may view the live game play while they are playing in their local game slice during time period 340B. Spectator S1 may be able to see the local game slice play of one or more other spectators while they are playing in their local game slice during time period 340B, in other embodiments. In some embodiments, spectator S1 may view the game slice play of other spectators while they are watching the live game play during time period 340A or 340D.

In some embodiments, the game play during time period 340B may not be continuous along the time line of the game environment. For example, the game play of spectator S1 may jump back to a previous point in the time line of the game environment when the character dies or fails to overcome an obstacle to allow spectator S1 an opportunity to attempt that portion of the game play again.

In some embodiments, time period 340B begins at a time within time slice 340A. For example, spectator S1 observed game play action during time slice 340A that they thought was exciting and something that they would enjoy playing, so they began their local game slice play at time period 340B at a point in time during time period 340A just before the exciting action. This can be used to allow spectator S1 to attempt a game obstacle that player P1 faced in the game, which can be very useful when training to play a game better.

In the period 340C between time separators 332 and 333, spectator S1 may be transitioned back to spectating the live game play in the multi-player gaming session. That is, the spectator may have chosen to quit playing the game slice, or the game slice has reached a predefined play boundary or period. As previously introduced, one or more transition scenes may be displayed to the spectator to align the game play in the game slice and the continuing live game play of the multi-player gaming session. For example, a building in the in-game environment may have been destroyed in the live game play; however, in the game slice because there are no updated metadata being provided the building may still be standing. As such, transition scenes may be generated that show the building being destroyed. Identification and generation of these transition scenes may be performed using AI. In another embodiment, the transition scenes may be predefined and generically apply to any transition between the game slice and live game play. In the period 430D after time separator 333, spectator S1 is returned back to spectating the live game play.

In some embodiments, the spectator's game play in their local game slice during time period 340B is merged back into the live game play. For example, in their local game slice, the spectator may have mined resources, done research, explored territory, or crafted goods to benefit a player or team in the live game play. The actions taken by spectator S1 in their local game slice during time period 840B, would then affect player P1 in the live game play in time period 340D.

In some embodiments, the time period 340C may show one or more replays of game action that occurred after time period 340A. These replays may include game action that occurred during time period 340B and may include game action that occurred previously during time period 340C, such as while a different replay was being shown. These replays can show game action other than the action between P1 and P2, such as action between two NPCs, or action involving another player when there are additional players playing. In some embodiments, spectator S1 can control which replays they view. Spectator S1 may set preferences which control which replays are shown during time period 340C.

In some embodiments, the live game play viewed by the spectator in time period 340A and 340D may be delayed from when the play originally happened, and may be shown from recorded game play. This can allow a spectator to view a historical game match, and still switch to playing a local game slice of the game match. In some embodiments, time slice 340D may begin with game play that happened at an earlier point in time from what the spectator would see if time period 340A were not interrupted by time period 340B. By showing the live game play in time period 340D with a delay it allows the spectator's viewing of the live game play to be more complete as game action does not need to be skipped to align viewing in time period 340D with the same time line as the viewing started in time period 340A.

Figure 4:
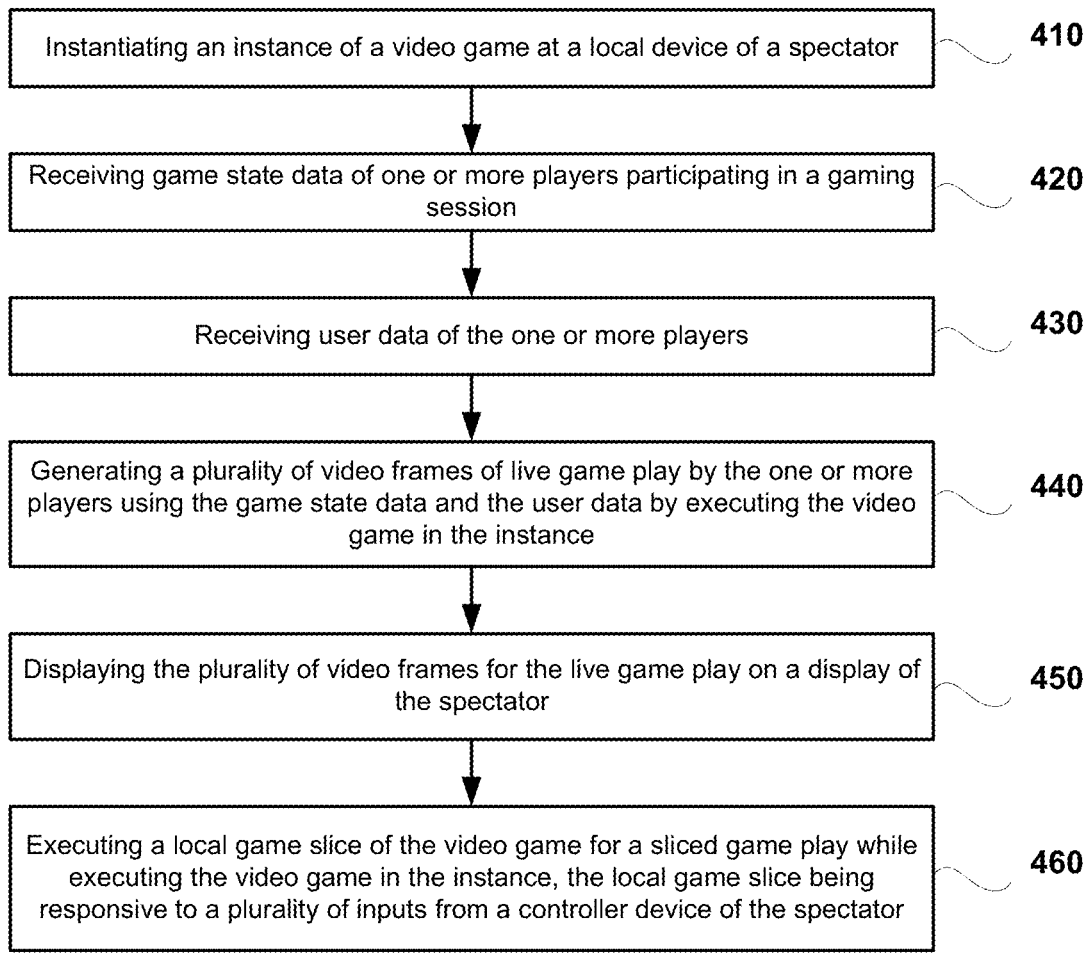
FIG. 4 is a flow diagram illustrating steps in a method for local game generation for spectating an event (e.g., live game play of a video game), and active participation in a simulation of the event, in accordance with one embodiment of the present disclosure.

With the detailed description of the various modules of the gaming server and client device communicating over a network, a method for implementing a game slice is now described in relation to flow diagram 400 of FIG. 4, in accordance with one embodiment of the present disclosure. In particular, flow diagram 400 illustrates the process and data flow of operations involved at the client side for local game generation for purposes of spectating an event (e.g., live game play of a video game), wherein the spectator may switch from watching the event to actively participating in a simulation of the event (e.g., through a game slice). In other embodiments, the game generation for spectating and execution of a game slice could be performed at a back-end server, or a mix between the client and back-end server. For example, the method of flow diagram 400 may be performed at least in part by the game slice engine 120 on the client side or by the game slice engine 220 on the could gaming server side of FIG. 1A and FIGS. 2A-2B.

At 410, the method includes instantiating an instance of a video game at a local device of a spectator. In one embodiment, the local device is executing game logic of the video game at a gaming engine. That is, rather than streaming video of the event which may require excessive network resources (e.g., bandwidth) when considering higher and higher resolution of images in video gaming, metadata is transmitted to the local device for rendering the video frames.

Metadata including, in part, game state and user data is received at the local device from a back-end server in association with the gaming session. For example, local generation of the video game is performed for spectating a live event, such as a single player or multi-player gaming session, as previously described. In particular, at 420, the method includes receiving game state data of one or more players participating in the gaming session. Also, at 430, the method includes receiving user data of the one or more players participating in the gaming session. In another embodiment, local generation of the video game is performed for spectating a recorded event, such as a previously played single player or multi-player gaming session.

As previously described, game state data that defines the state of the game play at a corresponding point in the game play (e.g., game state data includes game characters, game objects, object attributes, graphic overlays, assets of a character, skill set of the character, history of task accomplishments within the gaming application for the character, current geographic location of the character in the in-game environment, current status of the game play of the character, etc.). Game state may allow for generation of the in-game environment that existed at the corresponding point in the game play, such as for purposes of generating a game slice. User saved data may be used to personalize the gaming application for a corresponding user (e.g., a player), wherein the data may include information to personalize the character (e.g., shape, look, clothing, weaponry, game difficulty, game level, character attributes, etc.) in the game play. Other information may include random seed data that may be relevant to the game state, as previously described.

At 440, the method includes generating a plurality of video frames of the live game play by the one or more players using the game state data and the user data, and other metadata, by executing the video game in the instance on the local device. In particular, the local game engine need only to receive metadata associated with the live game play of the gaming session in order to generate the corresponding video frames. In that manner, the video frames need not be streamed from the back-end cloud gaming server which may require substantial network resources, and instead the metadata may be transmitted to the client/local device using substantially less network resources. That is, a rendering that is created locally has the advantage that it takes much less bandwidth to stream the game meta-data than it does to stream a video rendering. Moreover, a rendering created locally can be more responsive when bandwidth is limited as only the game meta-data needs to be transmitted to the spectator instead of needing to transmit all of the data for the rendering. More particularly, the limited bandwidth of rendering the view of the in-game environment locally is a benefit for viewing games on mobile devices that may have limited bandwidth and data restrictions. At 450, the method includes displaying the plurality of video frames for the live game play on a display of the spectator.

For example, the live event may be an eSports event, wherein a multi-player gaming session is performed live in front of an audience. Specifically, multiple spectators may view the live event in a common location (e.g., eSports arena) where there may be one or more displays set up to be viewable by multiple spectators. In addition, spectators can have one or more personal screens that they watch in addition to the screens viewable by multiple spectators. Each spectator may actively control which views of the event are shown on their personal screens. That is, the spectator controls the camera positioning for the renderings of the live game play. For example, camera positioning may include fixed camera positions, camera positions that follow individual players or teams, camera positions that are controlled by AI to follow various aspects of the action, and/or camera positions that are controlled by humans In addition, the custom camera angles selected by spectators can be used as input to AI. The AI can use the information from what spectators are actively viewing to control one or more renderings.

Furthermore, the spectator watching live game play through one or more renderings of the video game created through local game generation, may also watch one or more renderings of the game from other sources, such as streamed renderings, or an application generating a dashboard of scores and statistics from game meta-data. That is, the spectator view may be augmented with additional information, including score boards, statistics, maps, or other game meta-data can be available for display. Game meta-data can be available in a pre-configured rendering that a spectator can view. In some implementations a spectator can make their own custom renderings to show game meta-data. Renderings of game meta-data can be in the form of a customizable dashboard, that may be implemented in the form of overlays shown on top of another rendering, such as a score board in the corner of a display. In some implementations the rendering of game meta-data is dynamic. For example, when a game character is killed, a notification can pop-up in a rendering to give that information to a spectator. In some implementations the raw game meta-data can be streamed to a spectator's device and rendered by the spectator's device.

At some point, the spectator may decide to experience the in-game environment of the live game play, while the live game play is continuing. The spectator may not be able to play against a live professional (e.g., when spectating a live eSports event with professional players participating in a multi-player gaming session), but is able to play against a simulation of the live professional, through a respective character, in a local game slice.

In particular, at 460, the method includes generating a local game slice of the video game while executing the video game in the instance. That is, the local game slice is generated in the instance of the video game executing on the local device. In particular, the local game slice may be initialized using the most current game state data, user data, and AI state data. That is, the spectator may be playing the local game slice at the same point in the live game play at which the spectator decides to launch the game slice. In one embodiment, the video game instance transitions from live game play to the game slice, such that there is only one video game instance. In another embodiment, a new video game instance is instantiated for the game slice. In either case, the local game slice is responsive to a plurality of inputs from a controller device of the spectator.

In one embodiment, the game state data and user data associated with the live game play is not updated in the local game slice. That is, the local game slice is independent of the live game play. In particular, the local game slice may be a branch off the live game play of the live event, which continues on during the local game slice.

In one embodiment, the spectator provides the plurality of inputs to control a character of another player participating in the live event (e.g., the multi-player gaming session). The character is selectable by the spectator. For example, the spectator may choose any of the characters being controlled in the in-game environment of the live game play.

In another embodiment, the spectator provides the plurality of inputs to control a new character. That is, the new character is not associated with any characters of players participating in the live event. For example, the spectator may have in his or her user profile or user data a character for the video game. That character may be implemented within the local game slice, and is selected by the spectator. In still another embodiment, the spectator provides the plurality of inputs to control an NPC object in the video game, such as a boss, or enemy, etc.

In one embodiment, the method includes receiving AI state data. The AI state data may be associated with one or more characters controlled by the one or more players. As previously described, the AI state data may be generated in anticipation of a local game slice. That is, the AI state data may be used to simulate a player participating in the live event (e.g., gaming session) and/or a corresponding character that is controlled by that player. Other AI state data may be used to control random events in the live game play, such as cloud generation, wind generation, etc.

In other embodiments, AI state data need not be communicated to begin a local game slice. For example, a spectator watching someone play a game with puzzles may want to take over playing when the player encounters an interesting puzzle. As the actions of the puzzle are deterministic, no AI is needed to have the puzzle act the same in the local game slice as it does in the live game play.

AI state data may be used to control a first character of a first player in the local game slice. That is, AI state data that may define an AI model of an object in the in-game environment is used to control actions of the object. For example, the AI state data may control the actions of a player controlled character that is now simulated using the AI state data and/or corresponding AI model. Also, the AI state data may control the action of an NPC, such as an AI controlled character. In one embodiment, the NPC in a local game slice may simulate a character controlled by a player in the live game play, wherein the NPC is controlled by an AI using AI state data to emulate how the player would have played the character.

Figure 5:
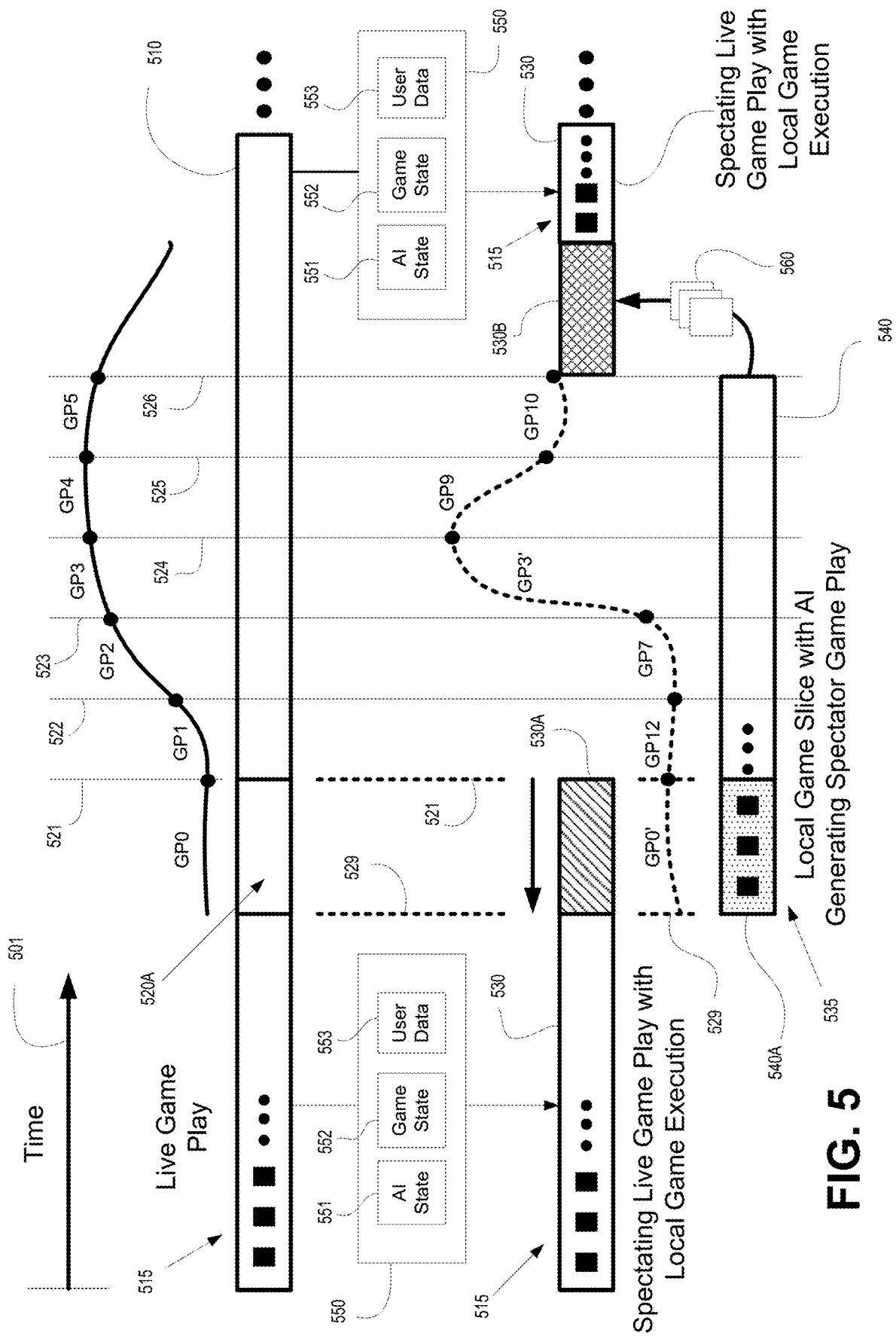
FIG. 5 illustrates a timeline showing a live event (e.g., live game play by one or more players in a gaming session), a spectator spectating the event through local game generation, and the spectator actively participation in a simulation of the event, in accordance with one embodiment of the present disclosure.

FIG. 5 illustrates a timeline 501 showing a live event (e.g., live game play by one or more players in a gaming session), a spectator spectating the event through local game generation, and the spectator actively participating in a simulation of the event, in accordance with one embodiment of the present disclosure. In particular, the live game play is generated through local and/or remote game generation for purposes of spectating the live event (e.g., live game play of a video game), wherein the spectator may switch from watching the event to actively participating in a simulation of the event (e.g., game slice). The game slice may be executing on the local copy of the video game on a client device of the spectator. For example, the local game logic may transition from generating video frames of the live game play to the game slice being controlled by the spectator using the same instance of the video game executing on the client device, in one embodiment. Although FIG. 5 is described in relation to switching from watching a live event to actively participating in a simulation of the live event, other embodiments are well suited to a spectator spectating a recorded event (e.g., recorded game play of a video game), and switching from watching the recorded event to actively participating in a simulation of the event (e.g., game slice).

As shown, the various live game play, spectating live game play, and game slice play is performed in association with a timeline 501. In particular, live game play 510 is shown continuously across timeline 501. That is, the live game play is continuous, and does not stop as the spectator is spectating a live event. The live game play 510 includes a plurality of video frames 515.

The live game play includes various periods as defined by time separators 521, 522, 523, 524, 525, 526, and 529, for example. In particular, period 520A is of particular interest to the spectator, and is defined by GP0. As an illustration, period 520A may be a battle between two professional players, or a battle between a live player (e.g., through a respective character) and a game boss. Period 520A in the live game play is defined by game path (GP) zero or GP0. The live game play continues on to include GP1 between separators 521 and 522, GP2 between separators 522 and 523, GP3 between separators 523 and 524, GP4 between separators 524 and 525, GP5 between separators 525 and 526, etc. The live game play includes various metadata 550, including AI state 551, game state 552, and user data 553, as previously described.

In particular, the metadata 550 may be used to generate video frames (and other media) of the live game play through execution of a local copy of the video game on a client device of the spectator. As shown, spectating live game play 530 includes the same video frames 515 associated with the live game play, as the metadata 550 from the live game play is used to generate the spectating live game play 530.

In section 530A, the spectator may have decided to actively participate in the in-game environment of the live game play, as previously described. As such, the spectating live game play 530 may be rewound to a natural beginning point of section 530A (at time separator 529), such as the start of a battle with the boss as performed in section 530A, and corresponding section 520A.

A local game slice with AI (e.g., AI state) generates spectator game play 540. For example, the live game play being generated for the spectator may be rewound in the local game slice using the game state data and the user data to the natural start point. Video frames 535 are generated in spectator game play 540. For example, in section 540A, the area of interest to the spectator (e.g., battle of the boss) is performed. In the game slice, the period 540A between time separators 529 and 521 may closely follow GP0 in section 520A; however, since the game slice is new and independent of the live game play 510, new video frames 535 are generated. As such, the spectator game play may still battle the boss in GP0', but in a different manner than that performed in the live game play 510.

Beyond the period 540A (indicating the area of interest to the spectator), the spectator game play in the game slice may go on different game paths and diverge from the live game play 510. For example, between time separators 521 and 522, instead of following GP1 as in the live game play, the spectator game play performs GP12. Also, between time separators 522 and 523, the spectator game play performs GP7 (in contrast to GP2 of the live game play 510. Further, between time separators 523 and 524, the spectator game play performs GP3', which may be the same game path GP3 in the live game play, but performed in a different manner Further, between time separators 524 and 525, the spectator game play performs GP9 (in contrast to GP4 of the live game play 510). Also, between time separators 525 and 526, the spectator game play performs GP10 (in contrast to GP5 of the live game play 510).

After time separator 526, the spectator may decide to quit the local game slice and return back to the live game play 510. In that case, execution of the local game slice is halted. During transition period 530B, transition scenes and/or frames 560 may be generated and displayed to the spectator. As previously described, the live event is continuous and may include one or more inconsistencies that do not align with the spectator game play in the local game slice. For example, a building may have been destroyed in the live game play, but remains intact in the spectator game play. In particular, AI may be used to identify the inconsistencies, and to generate the transition scenes 560. For example, a divergence from the live game play and the sliced game play (spectator game play) is determined. One or more transition scenes are generated to align the sliced game play back and the live game play through the divergence. The transition scenes are displayed to the spectator before resuming the generation of video frames of the live game play. In another embodiment, predefined transition scenes may be used to transition back to the live game play 510. In still other embodiments, replays of the live event may be provided during the transition period 530B, as previously described.

As soon as the spectator rejoins the live game play, metadata 550 is used to generate the video frames (and other media) on a local client device for purposes of spectating. As previously described, the metadata 550 includes AI state 551, game state 552, and user data 553. In particular, generation of video frames of the live game play is resumed for the display of the spectator using updated game state data and updated user data through execution of the instance of the video game on the client device.

Figure 6:
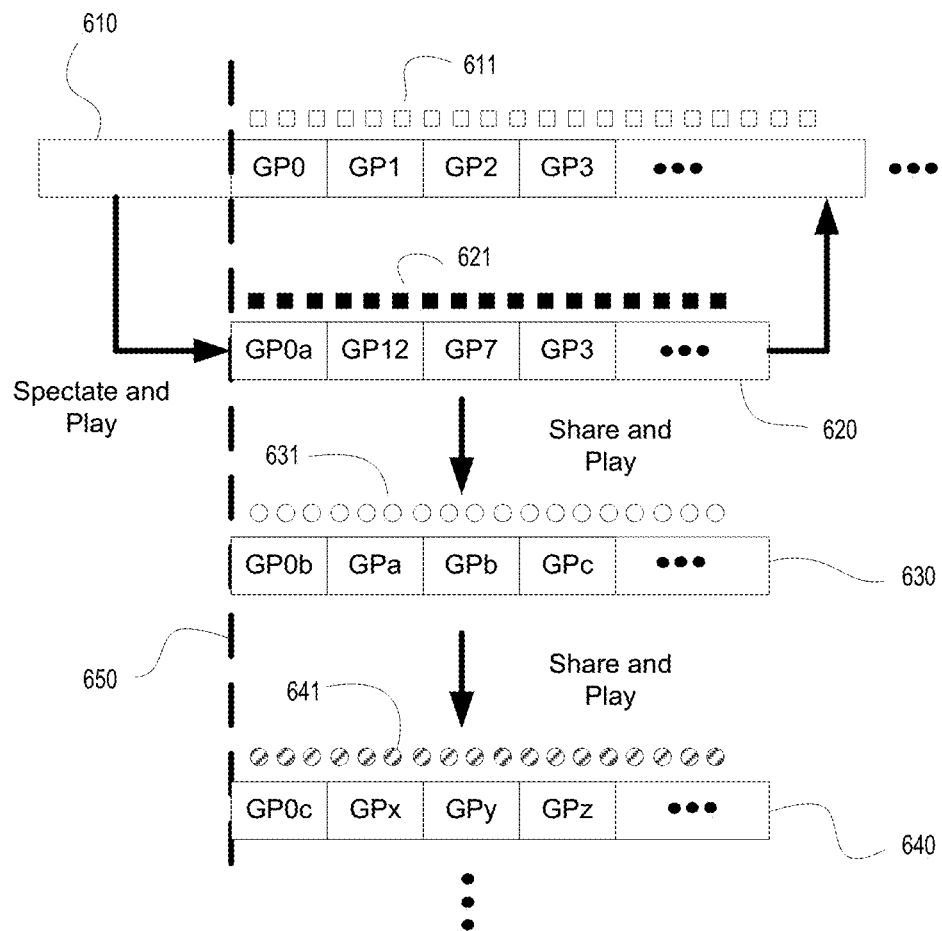
FIG. 6 illustrates the multiplicity of sharing and generating of local game slices based on a live event (e.g., live game play by one or more players in a gaming session), in accordance with one embodiment of the present disclosure.

FIG. 6 illustrates the multiplicity of sharing and generating of local game slices based on a live event (e.g., live game play by one or more players in a gaming session), in accordance with one embodiment of the present disclosure. In particular, one or more renderings controlled actively by a spectator (e.g., game slice) can be made available for viewing and playing by other spectators. In turn, those spectators can generate their own game slices that may also be made available for viewing and playing by still other spectators. The spectator actively controlling the renderings may also add commentary to the renderings they make available to other spectators.

As shown, a live game play 610 is generated using metadata 611. For example, the live game play 610 may be generated using a local copy of a corresponding video game on a client device of a spectator using the metadata 611. The spectator may be spectating the live game play before time separator 650.

After time separator 650, the spectator may be actively participating in the in-game environment in a simulation of the live game play, as previously described. In particular, a local game slice starting with metadata 611 corresponding to separator 650 is used to generate sliced game play 620 (e.g., spectator game play) through the local game slice. As such, metadata 621 is generated in the sliced game play 620.

In one embodiment, the sliced game play 620 can be shared for viewing and playing by other spectators. In addition, those spectators can also play their version of the sliced game play. In particular, the sliced game play 620 may be shared. At some point during the spectating of the sliced game play 620 by a second spectator, the second spectator may decide to actively participate in the in-game environment of the sliced game play 620 through another simulation. In particular, another local game slice starting with corresponding metadata 621 corresponding to a start point is used to generate sliced game play 630. In some embodiments, a spectator may be given the ability to choose which other spectator's local game slices they wish to view. These local game slices may be viewed live or from a recording of earlier play. Some criteria that can be used for determining a local game slice to view include which spectator played the local game slice, the result of the game play, the time it took to achieve a particular objective, or game play that optimized a particular metric. In some embodiments, a spectator can be provided with a scoreboard that shows local game slice play in addition to the live game play. Such a scoreboard may be normalized by chronology in the game world to account for differences between when different portions of the game were played in different game slices. A spectator can see their local game slice on the scoreboard while they are playing the local game slice, and compare their performance to the live game play and other spectator's scores at the spectator's current position in the game. The scoreboard may be rendered locally, or may be provided by streaming rendered frames of the scoreboard. The scoreboard may be displayed in a variety of ways, such as embedded in the game environment, as a picture-in-picture display, as a pop-up on demand, or on an additional screen. An additional screen can be provided by a variety of means, such as attaching another display to the device that is rendering the game play, a device rendering a web site, or a mobile app.

This process continues. For example, the sliced game play 630 can also be shared for viewing and playing by other spectators. At some point during the spectating of the sliced game play 630, the spectator (e.g., third spectator) may decide to actively participate in the in-game environment of the sliced game play 630 through another simulation. In particular, another local game slice starting with corresponding metadata 631 corresponding to a start point is used to generate sliced game play 640 having its own corresponding metadata 641.

In some embodiments, a player may be playing a game and switch to spectating the game that they were playing. The AI can then begin control of the character that they were playing in the game to have the character perform as a best estimate of how the player would have played in the game. For example, a player may fail at overcoming an obstacle, and when that segment of the game play starts over, they may choose to have the AI continue playing as they would so that the player can just sit back and watch the AI guess what they would have attempted next. The AI may be optimized to avoid repeating some of the same strategies, even if it decides that the player would have repeated themselves, simply to avoid being repetitive and make the viewing more interesting. The AI may be optimized to continually improve in their attempts so that the AI will eventually succeed in overcoming the obstacle, even if the AIs best fit for how the player would have played would not have resulted in successfully overcoming the obstacle. In such a case, having the AI play the game can be a great tool in assisting a player when they get stuck in a game to allow the player to continue with their game play.

Figure 7:
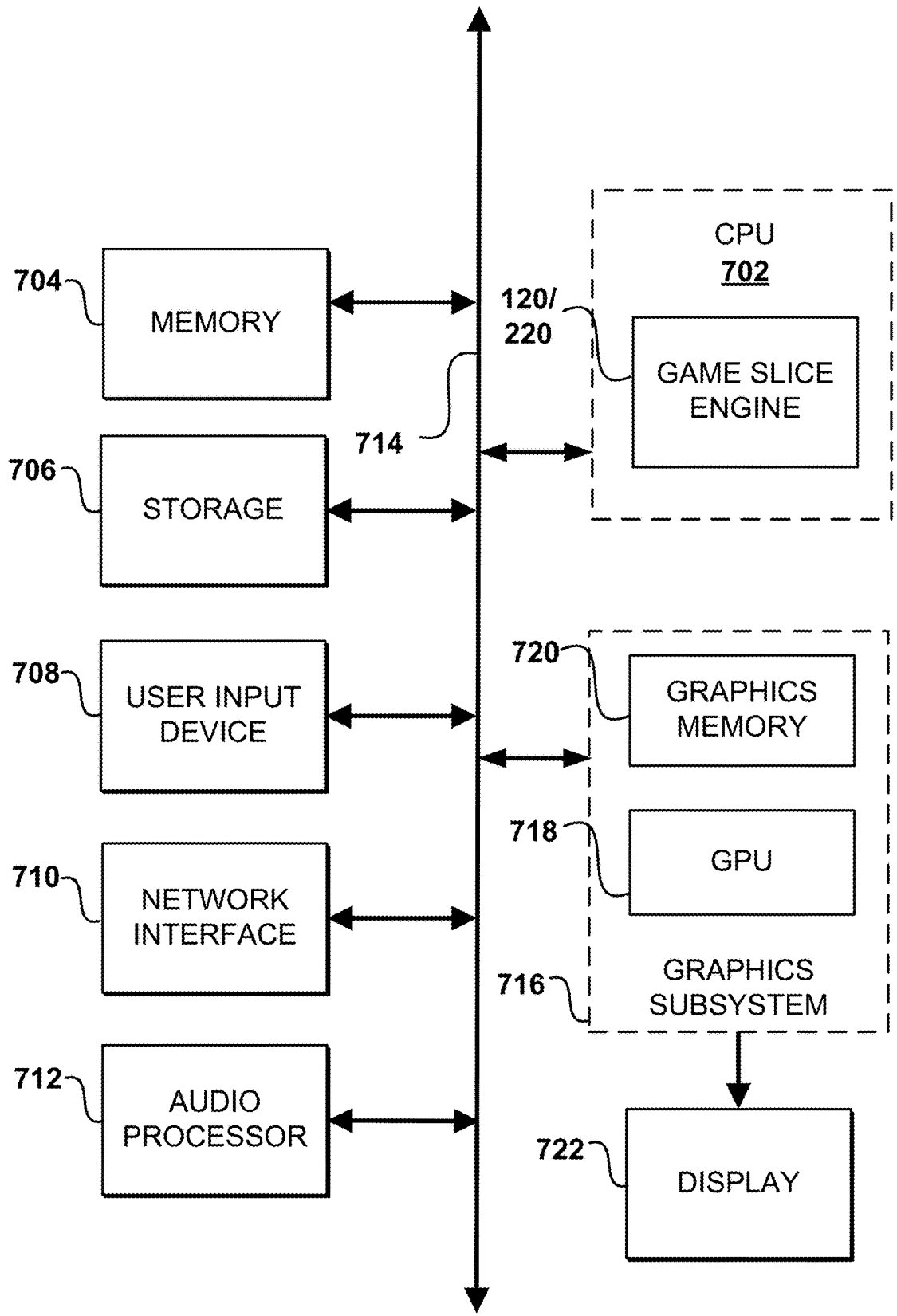
FIG. 7 illustrates components of an example device that can be used to perform aspects of the various embodiments of the present disclosure.

FIG. 7 illustrates components of an example device 700 that can be used to perform aspects of the various embodiments of the present disclosure. For example, FIG. 7 illustrates an exemplary hardware system suitable for local game generation for purposes of spectating an event (e.g., live game play of a video game), wherein the spectator may switch from watching the event to actively participating in a simulation of the event (e.g., game slice, in accordance with one embodiment of the present disclosure. This block diagram illustrates a device 700 that can incorporate or can be a personal computer, a server computer, gaming console, mobile device, or other digital device, each of which is suitable for practicing an embodiment of the invention. Device 700 includes a central processing unit (CPU) 702 for running software applications and optionally an operating system. CPU 702 may be comprised of one or more homogeneous or heterogeneous processing cores.

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 704 stores applications and data for use by the CPU 702 and GPU 716. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, graphics subsystem including GPU 716, memory 704, data storage 706, user input devices 708, network interface 710, and audio processor 712 are connected via one or more data buses 722.

A game slice engine 120/220 may be configured within the CPU or separate from the CPU as stand-alone hardware to perform one or more of local game generation for purposes of spectating an event (e.g., live game play of a video game), wherein the spectator may switch from watching the event to actively participating in a simulation of the event through execution of a game slice.

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by projection system 740. Display device 710 can be any device capable of displaying visual information in response to a signal from the device 700, including CRT, LCD, plasma, and OLED displays. Device 700 can provide the display device 710 with an analog or digital signal, for example.

Other embodiments for optimizing the graphics subsystem 714 could include multi-tenancy GPU operations where a GPU instance is shared between multiple applications, and distributed GPUs supporting a single game. The graphics subsystem 714 could be configured as one or more processing devices.

For example, the graphics subsystem 714 may be configured to perform multi-tenancy GPU functionality, wherein one graphics subsystem could be implementing graphics and/or rendering pipelines for multiple games, in one embodiment. That is, the graphics subsystem 714 is shared between multiple games that are being executed.

In other embodiments, the graphics subsystem 714 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

While specific embodiments have been provided to demonstrate the generation and implementation of a location based companion interface that is configured to support game play of a user, as well as the generation of a quest and/or challenge created external to the development of a corresponding gaming application. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for gaming, comprising:
receiving, over a network, a stream of video frames of a multi-player gaming session from a back-end game server executing a video game, wherein the stream of video frames is received at a local device of a first player participating in the multi-player gaming session, wherein the first player is controlling a first character in the multi-player gaming session, wherein a second player is controlling a second character in the multi-player gaming session;
detecting that a network connection between the local device and the back-end game server communicating through the network is below a quality of service (QoS) metric;
responsive to the detecting that the network connection is below the QoS metric, instantiating a local instance of the video game at the local device using game state data and user data of a plurality of players participating in the multi-player gaming session to enable game play by the first player of the video game;
controlling the second character in the local instance of the video game using an AI model configured with AI state data to emulate a behavior of the second player; and
sending video frames generated through execution of the local instance of the video game to a display associated with the first player.

2. The method of claim 1, further comprising:
pausing sending of the stream of video frames of the multi-player gaming session to the display.

3. The method of claim 1, further comprising:
receiving a plurality of controller inputs for controlling the second character from the back-end game server executing the AI model configured with the AI state data.

4. The method of claim 1, further comprising:
executing at the local device the AI model configured with the AI state data to generate a plurality of controller inputs for controlling the second character.

5. The method of claim 1, further comprising:
detecting that the network connection is above the QoS metric; and
restoring the multi-player gaming session by sending the stream of video frames received from the back-end game server to the display.

6. The method of claim 5, further comprising:
terminating or pausing execution of the local instance of the video game.

7. The method of claim 5, further comprising:
determining a divergence from another game play of the multi-player gaming session and the game play by the first player in the local instance of the video game;
generating one or more transition scenes; and
sending the one or more transition scenes to the display before sending the stream of video frames in the multi-player gaming session that is restored.

8. A non-transitory computer-readable medium storing a computer program for gaming, the computer-readable medium comprising:
program instructions for receiving, over a network, a stream of video frames of a multi-player gaming session from a back-end game server executing a video game, wherein the stream of video frames is received at a local device of a first player participating in the multi-player gaming session, wherein the first player is controlling a first character in the multi-player gaming session, wherein a second player is controlling a second character in the multi-player gaming session;
program instructions for detecting that a network connection between the local device and the back-end game server communicating through the network is below a quality of service (QoS) metric;
program instructions for responsive to the detecting that the network connection is below the QoS metric, instantiating a local instance of the video game at the local device using game state data and user data of a plurality of players participating in the multi-player gaming session to enable game play by the first player of the video game;
program instructions for controlling the second character in the local instance of the video game using an AI model configured with AI state data to emulate a behavior of the second player; and
program instructions for sending video frames generated through execution of the local instance of the video game to a display associated with the first player.

9. The non-transitory computer-readable medium of claim 8, further comprising:
program instructions for pausing sending of the stream of video frames of the multi-player gaming session to the display.

10. The non-transitory computer-readable medium of claim 8, further comprising:
program instructions for receiving a plurality of controller inputs for controlling the second character from the back-end game server executing the AI model configured with the AI state data.

11. The non-transitory computer-readable medium of claim 8, further comprising:
program instructions for executing at the local device the AI model configured with the AI state data to generate a plurality of controller inputs for controlling the second character.

12. The non-transitory computer-readable medium of claim 8, further comprising:
program instructions for detecting that the network connection is above the QoS metric; and
program instructions for restoring the multi-player gaming session by sending the stream of video frames received from the back-end game server to the display.

13. The non-transitory computer-readable medium of claim 12, further comprising:
program instructions for terminating or pausing execution of the local instance of the video game.

14. The non-transitory computer-readable medium of claim 12, further comprising:
program instructions for determining a divergence from another game play of the multi-player gaming session and the game play by the first player in the local instance of the video game;
program instructions for generating one or more transition scenes; and
program instructions for sending the one or more transition scenes to the display before sending the stream of video frames in the multi-player gaming session that is restored.

15. A computer system, comprising:
a processor; and
memory coupled to the processor and having stored therein instructions that, if executed by the computer system, cause the computer system to execute a method for gaming comprising:
receiving, over a network, a stream of video frames of a multi-player gaming session from a back-end game server executing a video game, wherein the stream of video frames is received at a local device of a first player participating in the multi-player gaming session, wherein the first player is controlling a first character in the multi-player gaming session, wherein a second player is controlling a second character in the multi-player gaming session;
detecting that a network connection between the local device and the back-end game server communicating through the network is below a quality of service (QoS) metric;
responsive to the detecting that the network connection is below the QoS metric, instantiating a local instance of the video game at the local device using game state data and user data of a plurality of players participating in the multi-player gaming session to enable game play by the first player of the video game;
controlling the second character in the local instance of the video game using an AI model configured with AI state data to emulate behavior of the second player; and
sending video frames generated through execution of the local instance of the video game to a display associated with the first player.

16. The computer system of claim 15, the method further comprising:
pausing sending of the stream of video frames of the multi-player gaming session to the display.

17. The computer system of claim 15, the method further comprising:

receiving a plurality of controller inputs for controlling the second character from the back-end game server executing the AI model configured with the AI state data.

18. The computer system of claim 15, the method further comprising:
    executing at the local device the AI model configured with the AI state data to generate a plurality of controller inputs for controlling the second character.

19. The computer system of claim 15, the method further comprising:
    detecting that the network connection is above the QoS metric;
    restoring the multi-player gaming session by sending the stream of video frames received from the back-end game server to the display; and
    terminating or pausing execution of the local instance of the video game.

20. The computer system of claim 19, the method further comprising:
    determining a divergence from another game play of the multi-player gaming session and the game play by the first player in the local instance of the video game;
    generating one or more transition scenes; and
    sending the one or more transition scenes to the display before sending the stream of video frames in the multi-player gaming session that is restored.

* * * * *